United States Patent [19]

Spoor

[11] 4,208,905
[45] Jun. 24, 1980

[54] MINIATURE LOAD BEAMS

[75] Inventor: Martin Spoor, Cambridge, Mass.

[73] Assignee: Bofors America, Inc., Edison, N.J.

[21] Appl. No.: 944,757

[22] Filed: Sep. 22, 1978

[51] Int. Cl.² .............................................. G01L 1/22
[52] U.S. Cl. .................................................. 73/141 A
[58] Field of Search ..................... 73/141 A; 177/211; 338/2, 4, 5, 211, 234

[56] References Cited

U.S. PATENT DOCUMENTS

| | | | |
|---|---|---|---|
| 3,180,139 | 4/1965 | Soderholm | 73/141 A |
| 3,280,623 | 10/1966 | Saxl | 73/141 A |
| 3,359,789 | 12/1967 | Forse | 73/141 A X |
| 3,411,361 | 11/1968 | McLellan | 338/4 X |
| 3,521,484 | 7/1970 | Dybvad | 73/141 A X |
| 3,837,416 | 9/1974 | Nozaki | 73/141 A X |

*Primary Examiner*—S. Clement Swisher
*Attorney, Agent, or Firm*—James E. Mrose

[57] ABSTRACT

Precision strain-gage transducers of low-cost construction, which lend themselves well to expression in the form of protectively-enclosed miniature load beams, are developed from sensing elements fine-blanked from wholly flat thin metallic sheet stock, the shaping and dimensioning of critical strain-responsive portions being controlled by the fine-blanking of both inner and outer edges of the element. Versatile mounting and loading provisions are conveniently associated with the element by way of simple openings formed laterally of the strain-responsive portions, and protective enclosure of sensitive strain gages and the strain-responsive portions is achieved by the transverse build-up of the element with stamped sheet-stock flanges affixed and sealed to it at spaced positions and to ends of a surrounding tubular bellows.

5 Claims, 12 Drawing Figures

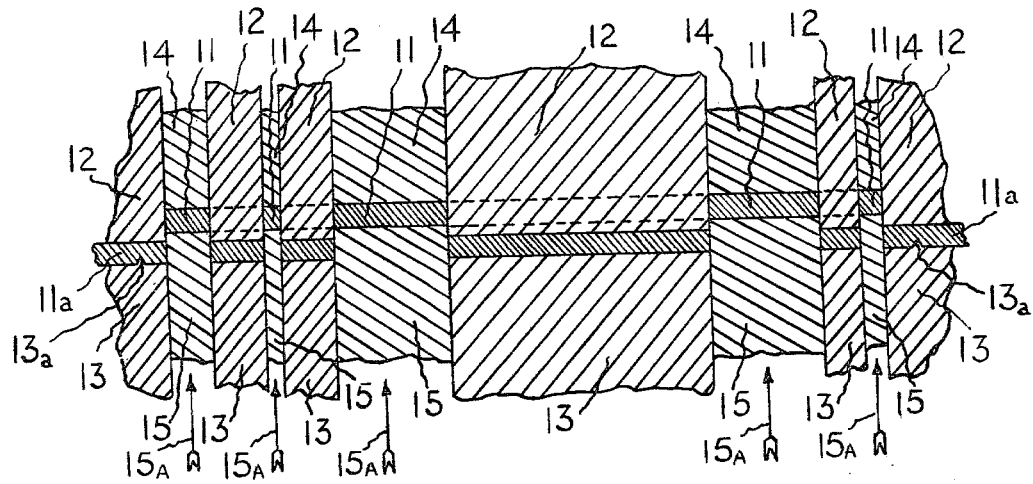
FIG. 1A
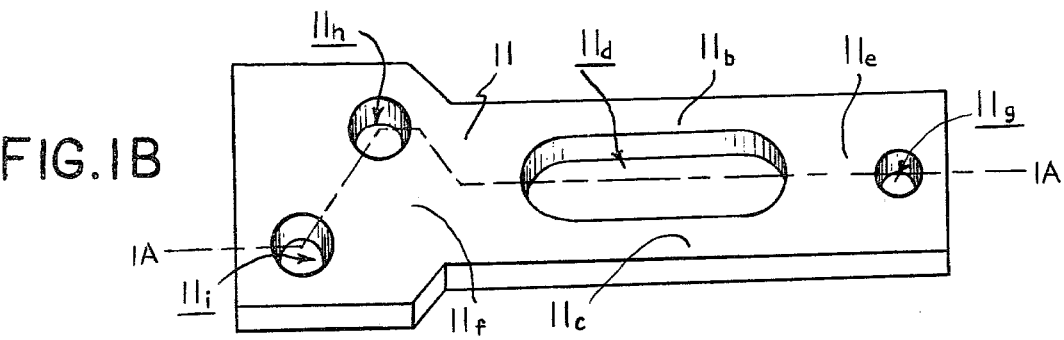
FIG. 1B
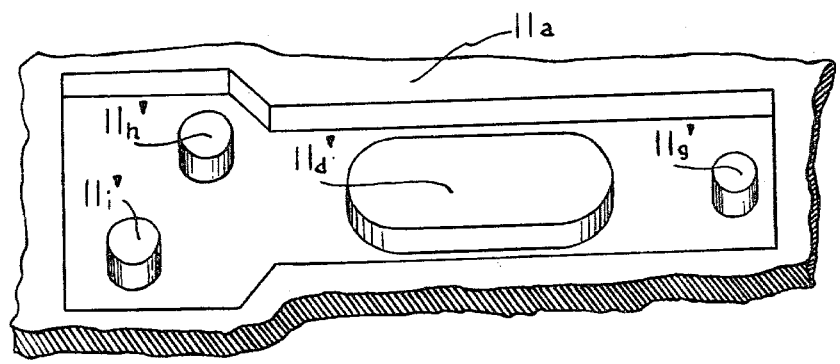
FIG. 1C
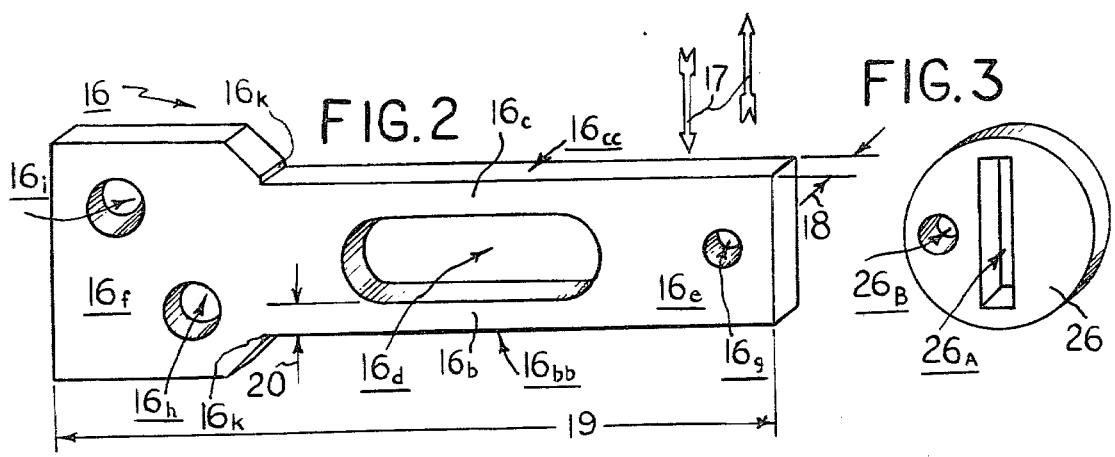
FIG. 2
FIG. 3

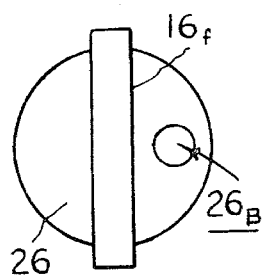
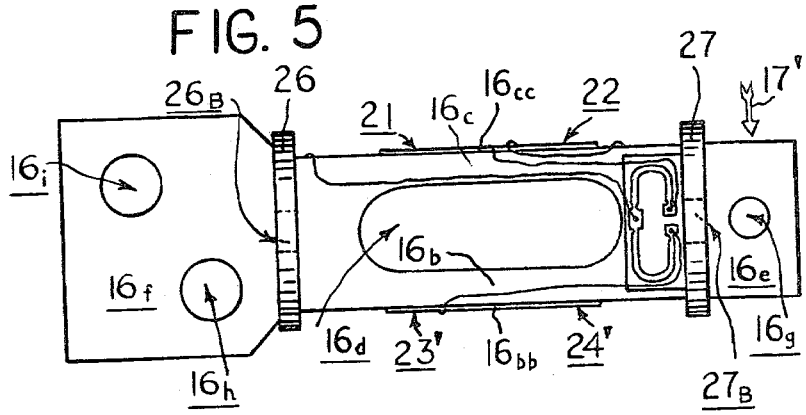
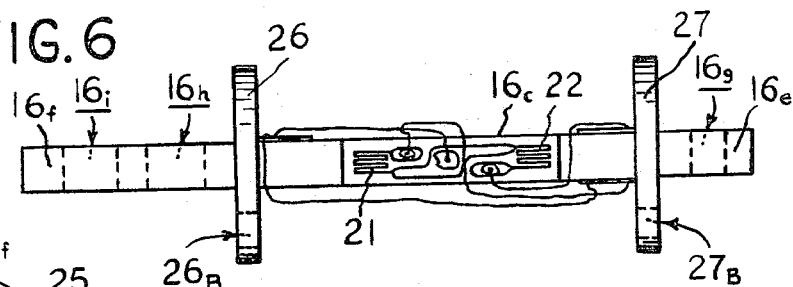
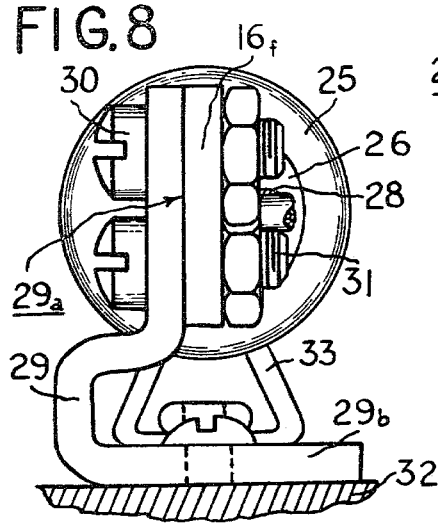
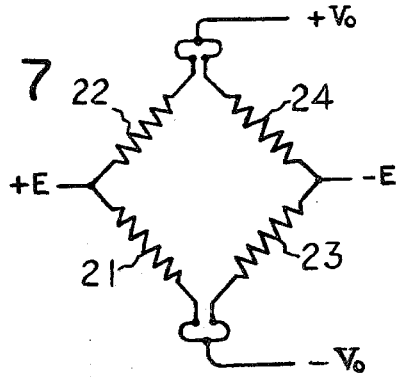
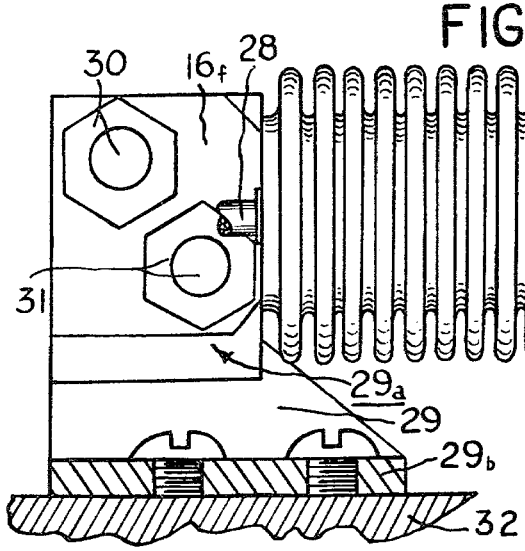
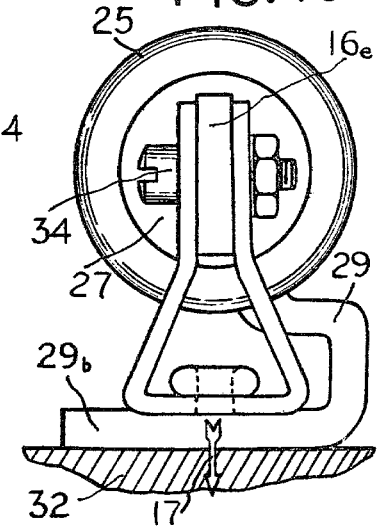

MINIATURE LOAD BEAMS

BACKGROUND OF THE INVENTION

The present invention relates to improvements in precision strain-gage transducers which may be fabricated inexpensively, and, in one particular aspect, to unique high-performance miniature load beams and the like wherein the sensing element is of uniform-thickness flat sheet stock having critical gaged strain-responsive portions defined with great exactness by material removals made in the transverse direction without circular machining, by fine-blanking or the equivalent.

Transducers, in which electrical-resistance strain gages respond to elastic deformations of elements undergoing loading, have long been known in a variety of sizes and forms and for purposes of characterizing such phenomena as force, torque, weight and pressure. From very early stages in the art, it had been established that substantially flat sheet-metal strips which would experience force-induced bending might be gaged directly to yield desired measurement information, as is evidenced by U.S. Pat. Nos. 2,316,203 and 2,321,322. However, perhaps the most common types of constructions, which were evolved to meet needs for general-purpose and high-capacity load cells and beams of exceptional and constant accuracy, came to require that relatively bulky and expensive masses of high-quality metal be shaped into complex configurations. The related set-up operations, tooling, handling, and material-removal machining involved in their manufacture have intensified the labor, material, time and cost associated with intricate shaping and exact dimensioning of such transducers. In addition to the critical deformable sensing portions of the transducers, their load-transmitting end connections have also required accurate machining to insure that forces will always be directed correctly for measurement and that protective enclosures will fit and function properly. For such reasons, transducer designers have favored constructions in which they might rely upon accurate but simple circular-machining of critical portions and coarser slotting or other inexpensive material-removals at portions which are less likely to affect measurements. In particular, the sites at and near gage locations have customarily been machined with a care which is consistent with the need to have the strain gages respond very precisely and repeatably to force-induced surface deformations of underlying material. The latter has been true even in instances where sensing elements of transducers have been formed substantially flat, the gaged edges and the flat faces both being machined, as in the cases of a load cell element in U.S. Pat. No. 3,222,628 and a force sensing link in U.S. Pat. No. 4,059,012.

SUMMARY OF THE INVENTION

The present invention is aimed at creating improved and simplified transducers, such as miniature load beams, in which low cost of manufacture is nevertheless consonant with highly precise operation, and in which conventional complex machining and severe wastage of quality stock are avoided by way of the fine-blanking of sheet material and the build-up of transducer assemblies about a flat stamped sensing element. In a preferred embodiment, a low-capacity precision miniaturized beam-type transducer of a parallelogram configuration is developed from flat-stock beryllium-cooper (BeCu) material of high yield strength, by transverse shearing of the material in a stamping or blanking die which forms a uniform-thickness element the outline of which is broad at one end and no wider in its intermediate portion than at its opposite end. Spaced parallel beams are cut to exact dimensions at the intermediate portion, and precise mounting apertures are cut in the end portions, all simultaneously with the cutting of the outline and all by the transverse shearing involved in fine blanking. Beam dimensions in directions normal to the thickness direction of the flat stock are kept to at least 50% of the latter thickness dimension, to avoid material collapse which could impair operation. Strain gages are applied to beam surfaces which have been produced by the transverse shearing, without preparatory machining. Enclosure of the gaging sites, and of the relatively thin parallel beam elements on which they occur, is achieved by way of a bellows-type flexible sleeve which is bonded at its opposite ends with spaced stiff flanges, the latter being stamped items fitted onto and brazed with the flat fine-blanked element to afford the needed transverse expanses accommodating electrical leads and sealing and flushing provisions, as well as the aforementioned bonding of ends of the bellows. The broader flat end of the element, which protrudes from the bellows-enclosed portion, advantageously serves to mount the transducer, by way of bracketing which abuts its flat sides and is held in place by mounting bolts which mate with holes accurately stamped through that end and are desirably subjected essentially to shear. Similarly, loading is readily applied to the narrower end of the mounted beam via a simple fixture which passes through an accommodating hole stamped through that end.

Accordingly, it is one of the objects of the present invention to promote unique and economical fabrication of precise strain-gage transducers in which flat sensing elements are critically shaped by being transversely relieved of material without conventional machining, and in which mounting and loading features are likewise shaped at integral flat ends of the element.

A further object is to provide a novel and improved miniature low-capacity strain-gage transducer in which a precision sensing element is of flat sheet-type stock shaped via accurate low-cost stamping which transversely shears the stock to establish both the critical deformable regions where gaged responses take place and the end regions at which mounting and loading are achieved.

Still further, it is an object to reduce the complexity and expense of production of miniature low-capacity strain-gage transducers, while nevertheless promoting outstanding operational accuracy, through use of fine-blanked flat stock of high yield strength for an element in which critical deformable gaged mid-regions are integral with flat load-transmitting end regions blanked for mounting and loading, and in which sealing and connections are promoted by means of stamped flat-stock transversely-extending flanges fitted over the element from one end.

BRIEF DESCRIPTION OF THE DRAWINGS

Although those aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1A provides a transverse cross section of flat transducer-element metal stock undergoing fine-blanking, with the ramming in a top dead center condition, for forming a miniature load-beam element in accordance with the present teachings;

FIG. 1B portrays the load-beam element fine-blanked in the arrangement of FIG. 1A;

FIG. 1C protrays stock and blanked-out remnants of the fine-blanking characterized in FIGS. 1A and 1B;

FIG. 2 is a perspective view of a fine-blanked miniature transducer element which is wholly flat and is apertured transversely to develop a parallelogram-beam array suitable for gaging along its edges to characterize loadings laterally between its ends in directions parallel with its flat side surfaces;

FIG. 3 is a perspective view of a flange adapted for fitting with the transducer element of FIG. 2, to facilitate protective enclosure of the element;

FIG. 4 provides an end view of a transducer element such as that of FIG. 2 fitted with end flanges like that of FIG. 3;

FIG. 5 views the transducer arrangement of FIG. 4 from one side, showing the element to be equipped with strain gages along fine-blanked top and bottom edge surfaces;

FIG. 6 depicts the arrangement of FIG. 5 from the top;

FIG. 7 is a schematic diagram of an electrical bridge array in which gages of the transducer arrangement of FIGS. 4-6 are disposed to occasion the intended electrical measurements;

FIG. 8 is a view from the mounted end of a completed and bracket-mounted miniature load beam including a transducer arrangement like that of FIGS. 4-6;

FIG. 9 represents the miniature load beam of FIG. 8 as seen from its right side; and FIG. 10 views the load beam of FIGS. 8 and 9 from the loaded end, together with a load-coupling yoke.

DETAILED DESCRIPTION OF THE PREFERRED EMBODIMENTS

Having reference to the drawings, wherein like reference characters designate identical or corresponding components and units throughout the several views, and more particularly to FIG. 1A thereof, the flat plate-type metal stock 11a which is to yield a transducer sensing element or beam member, 11, is shown to be disposed within the die parts of a fine-blanking press while they are transiently in a top-dead-center condition. The resulting sheared piece, in the form of sensing element, 11, is depicted as removed from the press in FIG. 1B, and the section line 1A—1A there associated with it shows the irregular course along which the FIG. 1A section is taken so as to facilitate illustration of simultaneous shearings of the non-aligned holes which are to be formed in that particular sensing element. For reasons which are discussed more fully hereinafter, the element 11 is shaped to have two bendable parallel beam portions, 11b and 11c, which extend alongside an elongated relatively large central opening 11d, and the relatively stiff ends 11e and 11f connection the ends of those beam portions are provided with a single through-hole, 11g, and a pair of through-holes, 11h and 11i, respectively. The fine-blanking operation by which element 11 is cleanly sheared from a selected uniform-thickness flat stock 11a leaves the remnants as depicted in FIG. 1C, wherein the shear-separated pieces or slugs are designated by the same reference characters which identify the corresponding through-holes in FIG. 1B, except that distinguishing single-prime accents are added to them in FIG. 1C.

Transducer sensing elements such as element 11 are generally fashioned with very great dimensional precision, to insure that all like transducers will then be likely to respond similarly and predictably. Those portions which are expected to undergo elastic deformations and to communicate those deformations to associated strain gages are particularly critical, both as to dimensional uniformity and in respect of homogeneity of material, including the material exposed to surfaces where gages are bonded. Beam portions 11b and 11c are of that character, for example, and therefore call for maintenance of close dimensional tolerances and for the production of smooth edge surfaces which have a high-quality finish. When such accurate dimensions and surface-finish are achieved directly in the blanking or stamping operation, very significant economies can be realized, although marked advantage can also result when many wholly flat sensing elements cut less accurately or smoothly are conveniently stacked for lowered-cost machining, together, to more exact size and smoothness. An important collateral factor, which is recognized and taken into account in these advantageous practices, is the commercial moderate-cost availability of plate or sheet stock of homogeneous quality and uniform exact thicknesses within very close tolerances, such that no significant mechanical variations are left to be experienced if the transverse cutting is performed cleanly and accurately.

it is in the latter connection, namely the precise and smooth-finished shaping of a transducer element, transversely to its parallel flat sides, that fine-blanking is of most remarkable effect. That practice involves the clean shearing of both inner and outer edges in a single blanking or stamping operation, without rough breakage or tearing at such sites, primarily as the result of very firm restraints imposed by clamping of stock between pressure plates and by the material-biting and holding of "Vee" ridges or the like. The stock undergoing shearing does not later require flattening, because it does not become bent, and material near the shear sites does not experience serious deformations which might reduce the homogeneity of grain and/or crystalline quality of the element, and the sheared edges tend to be smooth because material there can slip or shear only along exceedingly thin planes while all else is restrained from tearing or breaking apart irregularly. In FIG. 1A, for example, the upper die plate parts 12 and the lower table parts 13 sandwich the uniform-thickness sheet stock 11a between them in a very tightly clamped relationship, assisted by "Vee" knife-edge or ridge projections such as 13a which bite into and hold the stock near and around shear sites, in those portions of the stock which will remain as scrap or slugs. Elsewhere than along those areas which are being clamped between the die and table parts 12 and 13, the same stock 11a has not only been clamped securely also but has been forced to undergo transverse physical displacement, upwardly in the case under discussion, with the result that the piece-part 11 has been separated from the stock 11a by material-slippage or shearing, along very narrow and exact paths as defined largely by the close fit between the die parts of the fine-blanking machine or punch. In that connection, it may be observed in FIG. 1A that the piece-part or intended transducer element 11 is tightly sandwiched between an upper die member or ejector 14 and a lower punch member 15, the latter having been driven upwardly under sudden and intense thrusting as characterized by arrows 15A. Ejector member 14 allows that upward punching action to take place, by moving to accomodate the same, but it does not relinquish its clamping of the sandwiched stock while the shearing action is occurring. At the completion of a full stroke to effect the shearing, the machine parts are opened and release both the desired element, 11 (FIG. 1B), and the scrap and slugs (FIG. 1C), and additional stock may then be advanced into position and clamped and sheared in another cycle to yield another element which is a precision reproduction of the first, and so on.

A preferred stock material, which will shear cleanly and smoothly in thicknesses suited to the fabrication of transducer elements such as are described herein, is a beryllium-cooper (BeCu) alloy cable of exhibiting high yield strength and elastic modulus. By way of example, a useful alloy with 1.8-2.0% beryllium, about 2% of cobalt and nickel, about 0.6% iron, and the balance copper, by weight, can have needed good spring qualities and yet will shear or slip smoothly and without troublesome tearing when fine-blanked in the form of $\frac{1}{8}$ inch stock; it also lends itself well to brazing. High "strain yield" materials (i.e., stress/strain) are preferred for transducer elements, of course, but not all of them can be sheared smoothly, cleanly and accurately to give the repeatable dimensional precision and edge surface evenness needed for economical high-volume production of such elements, even in the same dies and by way of fine-blanking. Although the desirable highly springy beryllium-copper tends to be expensive as a material, these fine-blanking practices enable it to be used with little waste and therefore to conserve costs, while at the same time yielding very high-quality transducer elements. However, if beryllium-cooper or equivalent materials are not used, for some reason, there can also nevertheless be important advantage in the stamping of elements with a lesser degree of precision and then stacking many of them in side-by-side alignment for more conventional finish-machining which will assure that their edges are regular and define precise dimensions at the critical sites on all the elements. The machining itself, as well as machining set-up times, can thereby be reduced in relation to what would be involved in ordinary metal-removal shopwork, even though elements produced in this way require initial designing in flat form which will accommodate such stamping and stacking. Some of the openings or like shaping may be relatively non-critical, dimensionally and as to surface quality, and may therefore need to be stamped no more than rather crudely and imprecisely and then left in that state; for example, one or both of the mounting holes 11h and 11i (FIG. 1B) may be of that character, if used only to accommodate fasteners and not to provide a moment-arm reference position for the transducer of which 11 is the sensing element. Whether fine-blanked or otherwise formed beforehand, the element blanks will normally be heat-treated subsequently, in accordance with conventional practices of that type, to insure that the material thereof is in a predetermined uniform state and will have prescribed characterstics suiting it to uses as the load-carrying or sensing element of a transducer; the flat elements, ungaged, may be conveniently stacked compactly for batched economical heat-treatment in large quantities. Simple tumbling will remove any burrs or minute die roll edges which might remain on the element, before gages are applied.

FIG. 2, the flat fine-blanked element 16 may be observed to be generally like the aforementioned element 11, and should be understood to be fashioned in the manner of and from the same material as element 11. Its intended transducer operation is that of a special variant of a cantilevered beam, with support being provided via a stiff relatively-wide end portion 16f and with loading being applied via an opposite stiff end portion 16e in direction of one of the arrows 17, substantially parallel with the flat broad-area sides of the element. Between those end portions, and of course integral with them, are the parallel bendable beam portions 16b and 16c, separated by the elongated central opening 16d. Those beam portions, united at their ends with the relatively stiff end portions of the element, form a known type of parallelogram sensor configuration wherein the relatively movable or free end 16e tends to deflect linearly in the directions of arrows 17 and wherein bending-induced surface strains developed along the beam portions 16b and 16c lend themselves to electrical straingaging which will cause an associated bridge circuit to produce outputs very accurately related to the load or force causing the deflection. In such an arrangement, it is assumed that the substantially rigid end portion 16f is fixedly mounted in relation to some support, by way of fasteners passing through the offset openings 16i and 16h, and that the opposite substantially rigid end portion 16e is loaded by way of a yoke or like fixture more loosely coupled with the element through the outboard opening 16g. Strain gages developing the desired responses should be disposed along edges of the beam portions 16c and 16b, preferably with a pair of such gages being spaced longitudinally along one edge of each beam portion at equal distances from the center but not too close to the end portions 16f and 16e. The outside top and bottom edges, 16cc and 16bb, are preferred for optimum responses, but, whether those or the inner edge surfaces are gaged, it is essential in either case that all the dimensions of beam portions 16c and 16b be held to close tolerances from element to element and that the gaged edge surfaces be smooth and devoid of any irregularities or inhomogeneities which would interfere with intended precision operation of the gage-beam combinations. Thickness 18 of the element may be about 0.125 inch, and the overall length 19 about 2.36 inch, and the thickness 20 of each beam portion about 0.19 inch for a 75-kilogram capacity transducer made of the aforesaid beryllium-cooper material, such that the beam, illustrated about twice a typical size in the drawings, is well miniaturized. Fine-blanking of the flat stock from which the element is made assures that the critical beam-portion dimensions and gaged surfaces are of the intended precision and quality in each piece-part or element, and there is no significant variation in thickness 18 because the stock is readily obtained with a predetermined uniform thickness from suppliers of such items and because the blanking operation itself does not introduce any such variation which might otherwise tend to result from stretching, bending and the like.

The preferred gaging of element 16 is represented in FIGS. 5 and 6, and is of the character of that described in U.S. Pat. No. 3,576,128, for example. Along the top edge 16cc of upper beam portion 16c there are two displaced gages, 21 and 22, whose filaments extend longitudinally therealong and which are bonded to the top edge near extremities of the beam portion for responses in tension and compression, respectively, as the beam end 16e is loading in the downward direction of arrow 17' (FIG. 5) while the opposite end 16f is held relatively stationary. Not visible in the illustrations, but located at corresponding sites 23' and 24' (FIG. 5) along bottom edge 16bb of beam portion 16b, are a further longitudinally spaced pair of such bonded electrical-resistance strain gages, where they will respond in compression and tension, respectively, as the beam undergoes that same loading. A typical electrical bridge-circuit interconnection for all such gages appears in FIG. 7, where the two gages at FIG. 5 sites 23' and 24' are represented by reference characters 23 and 24; with electrical excitation applied across terminals E, the bridge can be expected to exhibit electrical unbalance conditions, detectable across its output terminals Vo, which are very accurately related to the loading and which tend to be advantageously quite insensitive to slight irregularities or shifts in positioning of the loading.

The strain gages, and their associated wiring and compensation units, should be kept scrupulously isolated from environmental attack or like disturbances, such as those caused by moisture, corrosive or conductive fluids or particles, and handling/or accidental physical injury. One application for such miniature transducers is in commercial scales, for example, where wetness and dirt accumulations and harsh treatment by non-technical operators must be expected and accommodated without sacrifice of precision and reliability. Accordingly, for such applications the gaged element 16 has its sensitive electrical components and mechanical beam portions shrouded by a hermetically-sealed protective bellows 25 (FIGS. 8,9,10) of a low-cost generally-cylindrical type which tends to have a substantially negligible load-shunting effect. Typically, such a bellows may be of relatively "soft" tin-plated brass which will allow relatively free flexure in directions of beam deflections, while the transverse circularities tend to keep the shrouding rigid enough to resist handling and similar physical intrusions from outside. However, the bellows must of course have its open ends closed and sealed with the thin flat sensing element in such a way as to allow the beam end portions 16f and 16e to protrude, as shown. For those purposes, the thin-flat element is artificially built up transversely, by way of a spaced pair of circular flanges, 26 and 27, which are disposed in closely-fitted and bonded relationships with the element end portions 16f and 16e, respectively. Each of the two flanges is in the form of a disk of thin metal which may be tin plated or otherwise rendered compatible with soldering or other secure bonding with the bellows peripherally about its cylindrical exterior and inwardly with the element about its interior "keyed" opening, such as 26A (FIG. 3). Flange 26, nearer the mounting end of the transducer, is provided with a further opening, 26B, through which electrical cabling 28 (FIG. 9) may be brought and sealed with a suitable bonding material. After gaseous flushing and a final backfill with nitrogen or another suitable gas through a like opening 27B in flange 27, the latter opening may be solder-sealed with an eyelet to complete the enclosure and sealing.

Flanges 26 and 27 are fashioned from a thin and flat stock, such as beryllium copper, which may be only about 1/16 inch thick; accordingly, they lend themselves well to low-cost stamping or punching, including fine-blanking if desired. As is depicted in FIG. 2, the flat transducer element may include shoulder or stop formations 16k against which flange 26 may be abutted for proper location about the rigid end portion 16f longitudinally far enough from the central opening 16d and ends of beam portions 16c and 16b to avoid imposing constraints which would introduce undesirable "end effects" such as are known in the art. Likewise, although no such shoulders are provided for the outboard flange 27, its location is fixed sufficiently beyond the opposite ends of beam portions 16c and 16b to avoid introducing end effects on that account also. The close fit which occurs when flange 26 is mated about element 16 via its keyed opening 26A requires that the flange be put in place before the gages and their wiring are installed, and the same practice is called for in respect of possible problems with heat which attends soldering or brazing of the flanges onto the element.

Any mechanical interconnection between transducer ends 16e and 16f, other than by way of the gaged beam portions 16b and 16c, effects a shunting of forces around those gaged portions, with consequent reduction in transducer output for given loadings. However, a bellows such as 25 yields quite readily and, in a typical arrangement, shunts only about 0.07 pound. That is independent of the capacity for which the transducer may be designed, such that it represents only an exceedingly small by-pass in the case of a high-capacity transducer. Capacity of a transducer, within the framework of a given element outline, can be established for several ranges merely by properly sizing the central opening 16d and, therefore, the depths 20 of the gaged beam portions. For example, the illustrated unit leads itself to manufacture in 5, 10, 15, 25, 50 and 75 kilogram ranges, in one overall size, in that manner. However, the resulting beam depth 20 should in any event be at least about 50% of the stock width 18, else there can be collapse of the material during the fine-blanking; the same depth to height limit should be observed elsewhere in the element, also.

Mounting of the miniature-beam type transducer will generally require quite accurate and secure cantilevering of the unit by way of its larger end 16f. However, the exactly-sheared edges, and perfectly flat sides, and precisely-located transverse holes, of that end 16f, all promote reliable mounting with great nicety. In the latter connection, a mounting bracket 29 is depicted (FIGS. 8-10) with a planar vertical face 29a in abutted relation to a side of beam end 16f, and is held tightly locked with it by way of two transverse bolts 30 and 31 extending through the mounting openings 16i and 16h, respectively, and has a horizontal base 29b bolted to a support 32. At the free end, 16e, the loading fixture 33 is of a yoke type wherein the associated bolt 34 through opening 16g makes a relatively loose coupling with the transducer, thereby promoting its isolation from all but the downward forces which it is intended to measure. In other arrangements, a simple S-hook or like coupling may be used to apply load to the transducer.

The parallelogram-type beam is especially useful in high-performance transducers which operate over low load ranges, inasmuch as the beam portions will bend significantly and cause good gage responses. However, other types of transducers may be fashioned similarly, to good advantage, including those used with higher loading and involving gages responding more directly to effects of shear. In those different expressions, the gages may be applied to inner, rather than outer edges of the element, or may be applied instead to flat side surfaces of the element. Material grain may be important in some instances and may be oriented accordingly; for example, for the illustrated miniature beam, it is preferred that the Be Cu grain be oriented to run longitudinally in relation to the finished beam. Further, although a single flat plate element has been described, two or more such plates may be stacked side-by-side to form one sensing element, with one or both being gaged, to develop higher load-measuring capacities while yet retaining other advantages of the flat-stock fabrication. The cantilever-beam embodiment is not a limiting one, and flat units with different end fixtures may serve other purposes, such as those normally associated with tension and compression cells.

Accordingly, it should be understood that the specific embodiments and practices described in connection with this specification have been presented by way of disclosure rather than limitation, and that various modifications, combinations and substitutions may be effected by those skilled in the art without departure either in spirit or scope from this invention in its broader aspects and as set forth in the appended claims.

What I claim as new and desire to secure by Letters Patent of the United States is:

1. A miniature strain-gage transducer comprising a relatively thin single-piece flat-stock element of material having high elasticity and having spaced substantially flat force-transmitting end portions which are interconnected by coplanar integral extensions of a relatively thin and substantially flat elastically-deformable sensing portion, said end portions extending in opposite directions from said sensing portion and said end portions and sensing portion being wholly of substantially one uniform thickness corresponding substantially to the thickness of flat stock material from which the element is fashioned, said sensing portion having at least one elastically-deformable region of configuration defined by parallel sides thereof and by edge surfaces extending substantially transversely to said sides, said elastically-deformable region being narrower than said end portions but of the same thickness, electrical strain gage means responsive to surface strains exhibited by said elastically-deformable region in response to forces transmitted therethrough by said end portions, said flat end portions being of proportions rendering them substantially rigid in directions parallel with the sides thereof and being integrally interconnected with said sensing portion to transmit substantially all loading forces to and from said sensing portion in said directions, and means for mounting said flat end portions to transmit loading forces originating outside said transducer through said thin end portions in said directions in which they are substantially rigid, said means for mounting including openings extending transversely through said end portions and having edge surfaces disposed to engage with members for applying loads to and for restraining said edge surfaces thereof, said edge surfaces of said deformable region and said end portions being sheared by blanking of said element from said material in sheet form, and said elastically-deformable region and said end portions being everywhere of expanse transversely to said edge surfaces which is at least about 60% of the thickness of said material.

2. A miniature strain-gage transducer comprising a relatively thin single-piece flat-stock element of material having high elasticity and having spaced substantially flat force-transmitting end portions which are interconnected by and which are coplanar integral extensions of a relatively thin and substantially flat elastically-deformable sensing portion, said end portions and sensing portion being wholly of substantially one uniform thickness corresponding substantially to the thickness of flat stock material from which the element is fashioned, said element being of elongated substantially rectangular outline with said end portions extending in opposite directions from said sensing portion, said sensing portion having at least one elastically-deformable region of configuration defined by parallel sides thereof and by edge surfaces extending substantially transversely to said sides, said elastically-deformable region being everywhere of expanse transversely to said edge surfaces which is at lease 60% of the thickness of said material and said edge surfaces being surfaces sheared by fine-blanking of said element from said material in sheet form, electrical strain gage means responsive to surface strains exhibited by said elastically-deformable region in response to forces transmitted therethrough by said end portions, said flat end portions being of proportions rendering them substantially rigid in directions parallel with the sides thereof and transmitting substantially all loading forces to and from said sensing portion in said directions, a pair of thin collar-like flanges each surrounding and extending transversely outwardly from a different one of said flat end portions, each of said collar-like flanges being substantially flat and circular and having a diametrically-disposed rectangular opening of substantially the same cross-section as that of the transducer end portion which it surrounds, means sealing and bonding said flanges with said end portions about the inner peripheries thereof defined by the rectangular openings therethrough, and flexible enclosure means bonded and sealed with both of said flanges and extending therebetween in spaced protectively-enclosing surrounding relation to said elastically-deformable region and said strain gage means, said enclosure means comprising substantially tubular flexible sleeving bonded and sealed with outer peripheral edges of said flanges, said flat end portions of said transducer extending through and longitudinally outwardly of said flanges for mounting and loading connections therewith outside of said enclosure means, and means for mounting said flat end portions which extend through said flanges to transmit loading forces originating outside said transducer through said thin end portions in said directions in which they are substantially rigid.

3. A miniature strain-gage transducer comprising a relatively thin single-piece flat-stock element of material having high elasticity and having spaced substantially flat force-transmitting end portions which are interconnected by and which are coplanar integral extensions of a relatively thin and substantially flat elastically-deformable sensing portion, said end portions and sensing portion being wholly of substantially one uniform thickness corresponding substantially to the thickness of flat stock material from which the element is fashioned, said element being of elongated substantially rectangular outline with said end portions extending in opposite directions from said sensing portion and with one of said end portions being wider than the other and the said sensing portion, said sensing portion having at least one elastically-deformable region of configuration defined by parallel sides thereof and by edge surfaces extending substantially transversely to said sides and which comprises a pair of elongated substantially parallel spaced beam members integral with and extending between said end portions, each of said beam members having a pair of longitudinally-spaced elastically-deformable regions each nearer a different one of said end portions, said elastically-deformable region being everywhere of expanse transversely to said edge surfaces which is at least 60% of the thickness of said material and said edge surfaces being surfaces sheared by blanking of said element from said material in sheet form, electrical strain gage means responsive to surface strains exhibited by said elastically-deformable region in response to forces transmitted therethrough by said end portions and including electrical-resistance strain gages bonded to surfaces of each of said regions, said flat end portions being of proportions rendering them substantially rigid in direction parallel with the sides thereof and being integrally interconnected with said sensing portion to transmit substantially all loading forces to and from said sensing portion in said directions, and means for mounting said flat end portions to transmit loading forces originating outside said transducer through said thin end portions in said directions in which they are substantially rigid, said means for mounting including at least two openings extending transversely through said one of said end portions and having edge surfaces disposed to engage and be restrained by mounting bolts passed therethrough, and said other of said end portions having an opening extending transversely therethrough to receive therein a member for applying loads to edge surfaces thereof.

4. A miniature strain-gage transducer as set forth in claim 3 where in said pair of beam members is defined by the parallel sides of the uniform-thickness sensing portion and by substantially linear and parallel laterally-outside edge surfaces extending transversely to said sides and by inside edge surfaces extending transversely to said sides as margins of an opening transversely through said sensing portion, said inside and outside edge surfaces being sheared by the said blanking, and said strain gages being bonded to said outside edge surfaces of said beam members.

5. A miniature strain-gage transducer as set forth in claim 4 further including a pair of flat thin circular metal flanges fitted diametrically about and sealed with said end portions at positions displaced longitudinally from ends of said beam members, a tubular metal bellows bonded and sealed with outer peripheries of said flanges and extending therebetween in enclosing relationship to said beam members and strain gages, wherein one of said end portions is wider than the other and extends longitudinally outwardly of one of said flanges with at least two blanked openings extending transversely therethrough with edge surfaces disposed to engage and be restrained by mounting bolts passed therethrough, and wherein the other of said end portions extends outwardly of the other of said flanges with a blanked opening extending transversely therethrough with edge surfaces disposed to receive loads from a member passed therethrough, said one uniform thickness being of the order of about $\frac{1}{8}$ inch.

* * * * *